J. R. ABBOTT.
BILLIARD CUSHION.
APPLICATION FILED JUNE 3, 1914.

1,119,212.

Patented Dec. 1, 1914.

Witnesses.
Margaret M. McCathran.
G. Manning.

Inventor.
John Ralph Abbott.
By T. Walter Fowler,
atty.

UNITED STATES PATENT OFFICE.

JOHN RALPH ABBOTT, OF LONDON, ENGLAND.

BILLIARD-CUSHION.

1,119,212. Specification of Letters Patent. Patented Dec. 1, 1914.

Application filed June 3, 1914. Serial No. 842,605.

*To all whom it may concern:*

Be it known that I, JOHN RALPH ABBOTT, a subject of the King of England, residing at London, England, have invented certain new and useful Improvements in Billiard-Cushions, of which the following is a specification.

This invention has reference to improvements in and relating to the construction of cushions for billiard tables and the like.

According to the present invention I provide below the rubber face of the cushion and in front of a flexible spring member which supports and carries the said rubber face, an air space into which the rubber can be displaced downwardly when its nose is struck by a ball. The flexible spring member may be of spring metal or of resilient wood and preferably slopes upward and forward. The rubber is secured directly or indirectly to the upper portion of the spring member, and an upstanding boss or potential support extends from about the base of the said spring member to below the front part of the rubber nose without, however, normally making contact with the said rubber. This support is recessed at rear on its upper face adjacent to the spring member and its forward part may be rounded or ridged at top.

The cushion block which carries the rubber is firmly secured to a rear metal backing or wall which is preferably cut away and provided with a ledge on which the cushion block may be partly seated, and this metal backing or wall is with advantage undercut for the purpose.

Figure 1:
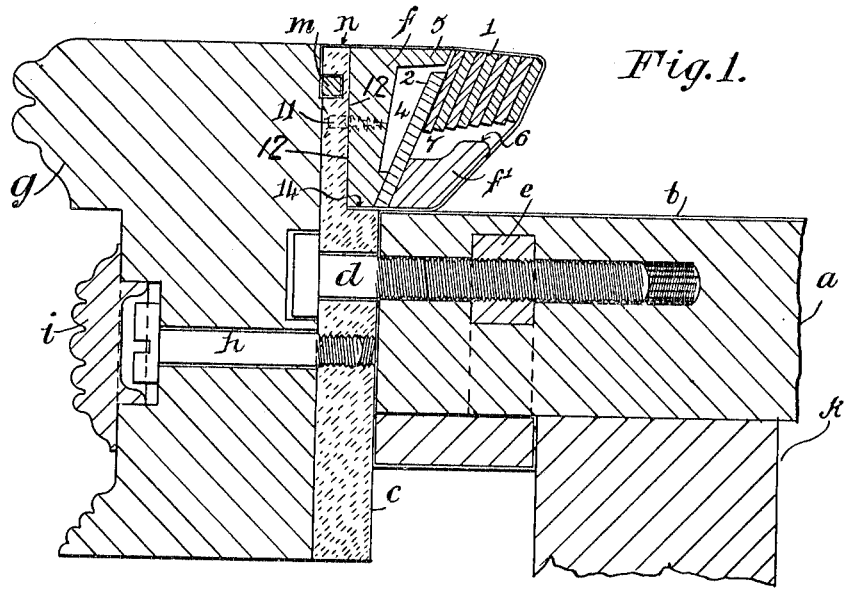
Figure 2:
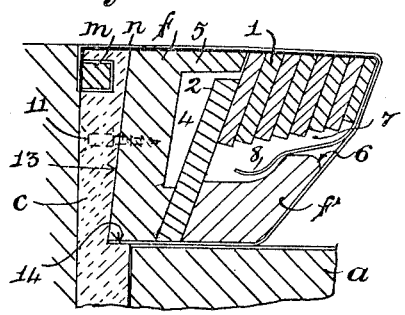
Figure 3:
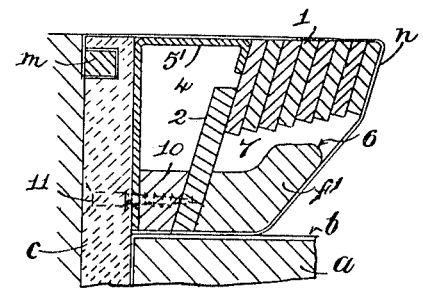
Figure 4:
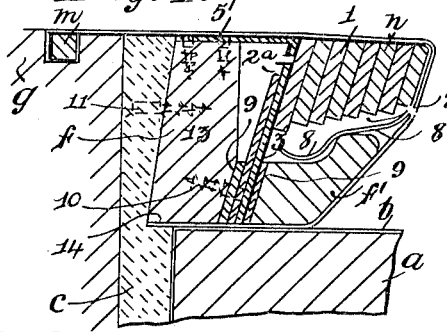
Figure 5:
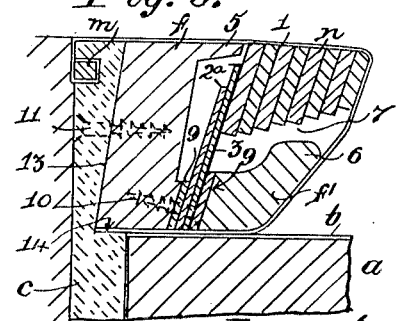

Upon the accompanying drawings which illustrate the present invention:—Figure 1 is a sectional elevation of the complete cushion, showing also the cushion frame. Fig. 2 is a sectional elevation on a slightly larger scale of the cushion and cushion block seated in part on a ledge in the metal backing. Fig. 3 is a similar view to Fig. 2, but showing the cushion block as an angle strip of metal. Fig. 4 is a similar view to Fig. 3 but shows a flexible spring blade behind the rubber instead of a resilient wooden tongue. Fig. 5 is a similar view to Fig. 2, but shows a flexible spring metal blade instead of a resilient wood tongue.

On these drawings $a$ represents the bed of the table made of slate or other suitable material and covered with billiard cloth $b$ in the usual manner. The metal block, wall or backing $c$ which may be of steel is secured to the edges of the bed $a$ by for instance bolts $d$ engaging nuts $e$. The cushion block $f$ rests upon the table bed and against the metal backing $c$, while the cushion frame $g$ is secured to the block or backing $c$ by for example bolts $h$, sunk in the cushion frame and covered by the usual rosettes $i$. The table frame is indicated at $k$, and $m$ is a wood fillet or strip for securing the cushion cloth $n$ in place.

The rubber 1 of the cushion is mounted directly or indirectly upon a spring member which may be a tongue 2 of resilient wood such as hickory (see Figs. 1, 2, 3) or a flexible metal blade $2^a$ (see Figs. 4 and 5). The rubber is solutioned or otherwise fixed to the wooden tongue 2 or may be solutioned and mounted on interposed fabric 3 in the case of the metal spring arm $2^a$.

The spring member is mounted at its lower part on the cushion block $f$ which latter is provided with a space 4 to the rear of the spring member so that the said flexible member may bend back when the rubber is struck by a ball. The flexible member is arranged to slope upwardly and forwardly away from the frame $g$ and the space above the top of the member 2 or $2^a$ is covered over by the arm 5 preferably integral with the cushion block or by the metal strip $5^1$ secured by screws to the block $f$. In Figs. 1, 2, and 5 a very small space is left between the front of 5 or $5^1$ and the rearmost rubber strip 1 carried by the spring member.

In front of the spring member 2 or $2^a$ is arranged a molding $f^1$ formed as a continuation of the cushion block $f$ and this molding at front is provided with a rounded or curved boss or ridge 6 extending upward toward the underside of the rubber 1. This molding $f^1$ and its ridge 6 are shown undercut at front. Between the rubber and this molding is left a space 7 into which the rubber can recede or be displaced when necessary. In this way I avoid the nose of the cushion lifting when sharply struck by a ball, which might cause the said ball to jump.

The object of this boss or ridge 6 is to afford a support for the rubber 1 in the event of undue vertical downward pressure on the rubber, while at other times leaving the spring-backed rubber free to respond and react quickly on the impact of the ball upon the cushion.

To prevent undue friction between the rubber 1 and this support 6 I may, if desired, insert a loose strip 8 of billiard table cloth or other smooth fabric over the support 6 thus avoiding the possibility of direct contact between the support and the rubber.

In Figs. 2 and 4 I have shown as being utilized for the strip 8, the fabric underlayer which usually passes around the cushion nose under the cushion cloth n.

The flexible member 2 or 2ª is anchored in place by screws 10 passed through its lower end into the base of the cushion block, or in any other suitable manner. The molding 6 may be secured to the cushion block or to the resilient member 2 by means of glue or screws or other appropriate fastening means.

It will be noted that the metal spring 2ª may comprise more than one blade and these blades may be inclosed between metal strips 9 secured by screws 10 to the cushion block.

The cushion block f is shown attached to the metal backing c by means of screws 11 passing through the backing c into the wood of the cushion block.

The cloth n which passes around the cushion covers in the space 7 between the rubber 1 and the molding f¹, being fastened at one end below the cushion block and at the other end tensioned by the wood fillet m wedged into the metal backing c or into the cushion frame g.

The rubber 1 which is secured to and carried by the resilient member 2 or 2ª extends above the top of said member to the level of the top of the arm 5 or 5ª and is adapted to bear against the forward end of the latter when the cushion is struck by a ball. The rubber strip nearest the resilient member 2 or 2ª may be slightly deeper or longer than the other rubber strips.

The metal backing c may be recessed or cut away on its front face as at 12 in Fig. 1 where the recess is square, or the recess may be undercut as at 13 in Figs. 2, 4 and 5. In each such case a ledge 14 is formed at the level of the top of the table bed or above the same to the extent of the thickness of the table cloth and the block f is seated at its corner upon said ledge 14. In this way the cushion block can be immovably fixed to the metal backing 6 which is itself bolted to the bed of the table so that a very firm support for the cushion is obtained.

Having thus described my invention what I claim as such and desire to secure by Letters Patent is:—

1. A billiard table cushion, comprising a cushion block having a recess in its forward part, a flexible member mounted at its lower part on said cushion block and having its upper end free to bend back into the recess in said cushion block, an arm projecting from said block to above the said flexible member, a rubber facing secured to the front of said flexible member, a free space below said rubber into which the latter may be displaced upon the impact of a ball, and a molding as a continuation of the base of the cushion block in front of said flexible member.

2. A billiard table cushion, comprising a cushion block having a recess in its forward part, a flexible member mounted at its lower part on said cushion block and having its upper end free to recede into the recess in said cushion block, an arm projecting from said block to above the said flexible member, a rubber facing secured to the front of said flexible member, a molding in front of said flexible member, and a front upstanding portion to said molding extending toward the underside of the said rubber, with a free space below said rubber into which the latter is displaceable.

3. A billiard table cushion, comprising a cushion block having a recess in its forward part, a flexible member mounted at its lower part on said cushion block and having its upper end free to recede into the recess in said cushion block, an arm projecting from said block to above the said flexible member, a rubber facing secured to the front of said flexible member, a continuation of the base of said cushion block in front of said flexible member and a front upstanding portion to said continuation extending toward the underside of the said rubber, with a free space below said rubber into which the latter is displaceable, and a protective fabric strip upon said upstanding portion to prevent contact with the rubber.

4. A billiard table cushion, comprising a cushion block having a recess in its forward part, a flexible member mounted at its lower part on said cushion block and having its upper end free to recede into the recess in said cushion block, an arm projecting from said block to above the said flexible member, a rubber facing secured to the front of said flexible member, a molding in front of said flexible member, and a front upstanding portion to said molding extending toward the underside of the said rubber with a free space below said rubber into which the latter is displaceable, billiard cloth stretched over said cushion and around the nose thereof and an underlayer of cloth below said billiard cloth, said underlayer being passed from the front of the rubber to lie loosely over the front upstanding portion of said molding.

5. A billiard table cushion, comprising a metal plate secured to the bed of the table and forming a wall to said bed, a cushion block connected to said metal plate and having a recess in its forward part, said plate anchoring said cushion block to said table bed, a resilient wooden tongue mounted at its lower part on said cushion block and having its upper end free to be bent back into the recess in said cushion block, an arm projecting from said block to above the said resilient wooden tongue, a rubber facing secured to the front of said resilient wooden tongue, a molding in front of said resilient wooden tongue and a front upstanding ridge portion to said molding extending toward the underside of the said rubber, with a free space below said rubber into which the latter is displaceable, said resilient tongue sloping upwardly and forwardly with its lower end arranged intermediate of the base of said cushion block and the molding.

6. A billiard cushion, comprising a metal plate secured to the bed of the table and forming a wall to said bed, a cushion block connected to said metal plate and having a recess in its forward part, said plate anchoring said cushion block to said table bed, a flexible member mounted at its lower part on said cushion block and having its upper end free to be bent back into the recess in said cushion block, an arm projecting from said block to above the said flexible member, and a rubber facing secured to and carried by the front of said flexible member, said metal plate being recessed on its front face to form a ledge at a right angle to said face and said cushion block being partly seated on said ledge.

7. A billiard cushion, comprising a metal plate secured to the bed of the table and forming a wall to said bed, a cushion block connected to said metal plate and having a recess in its forward part, said plate anchoring said cushion block to said table bed, a flexible member mounted at its lower part on said cushion block and having its upper end free to recede into the recess in said cushion block, an arm projecting from said block to above the said flexible member, a rubber facing secured to the front of said flexible member, said metal plate being recessed on its front face to form a ledge at the bottom of an undercut portion, and said cushion block being shaped to be seated in said undercut portion and on said ledge.

8. A billiard cushion comprising a cushion block, recessed at rear into a metal backing secured to the bed of the table, said metal backing serving to clamp said cushion block to said table bed, and said cushion block having a recess in its forward part, a resilient member anchored at its lower part to said cushion block and adapted to be bent back into the recess in said block, an arm extending from said cushion block to over said resilient member, an elastic cushion composed of strip rubber mounted on the front of said resilient member and carried by said member, a molding as a continuation of the base of said cushion block and extending forward to almost below the front of said rubber cushion, a free space between said rubber and said molding into which the rubber is displaceable upon the impact of a ball, and billiard table cloth stretched over said molding, rubber cushion and the top of said cushion block, and covering in said free space at the front.

9. A billiard cushion comprising a cushion block, recessed into the front of a metal backing which is secured to the bed of the table, said metal backing serving to clamp said cushion block to said table bed, and said cushion block having a recess in its forward part, a resilient member anchored at its lower part to said cushion block and adapted to be bent back slightly into the recess in said block, an arm extending from said cushion block to over said resilient member, an elastic cushion composed of strip rubber mounted on the front of said resilient member and carried by said member, a molding in continuation of the base of said cushion block extending to almost below the front of said rubber cushion, a longitudinal ridge upon the front part of said molding, a billiard table cloth stretched over said molding, rubber cushion and the top of said cushion block, said cloth being secured at one end below the cushion block and at its other end by a fillet inserted in a groove in the cushion support, and a free space between said rubber and said molding into which the rubber is displaceable upon the impact of a ball.

10. In a billiard table cushion, the combination of a metal backing recessed at front and provided with a rectangular ledge at the bottom of said recess, a cushion block seated in said recess and on said ledge, so that said ledge partly supports said cushion block, said cushion block being hollow for the greater part of its height, a resilient member anchored to the bottom of said cushion block and having its free end extending upwardly and forwardly of the recess in said hollow block, an arm from said cushion block projecting over said resilient member, a plurality of rubber strips forming a cushion secured to said resilient
5 member, said rubber cushion extending above said member level with said arm, a molding as a continuation of the base of said cushion block, said molding extending to almost below the front of said cushion, and a space between said molding and the 10 underside of said rubber cushion.

In testimony whereof I have affixed my signature in presence of two witnesses.

JOHN RALPH ABBOTT.

Witnesses:
 VICTOR FALLON FEENEY,
 EUSTACE HENRY BARKER.

Copies of this patent may be obtained for five cents each, by addressing the "Commissioner of Patents, Washington, D. C."